June 4, 1929.  J. J. DUFFY ET AL  1,715,825
TOOL FOR CUTTING VALVE STEMS
Filed Nov. 22, 1927
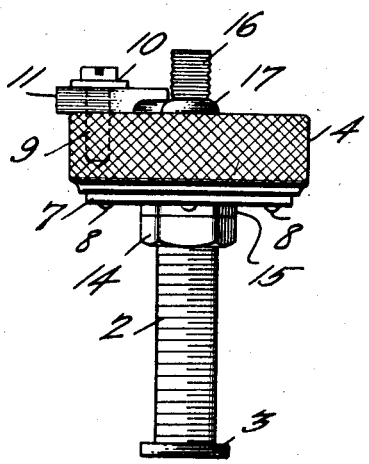
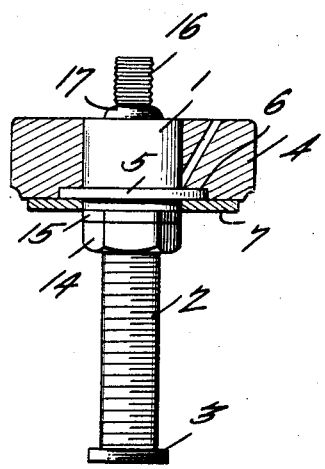
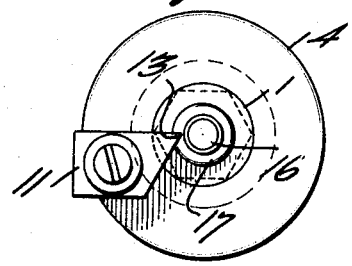
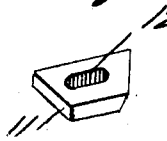
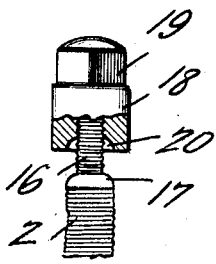
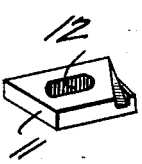
INVENTORS
JOHN J. DUFFY
FREDERICK HOFFMAN
BY
ATTORNEY.

Patented June 4, 1929.  1,715,825

UNITED STATES PATENT OFFICE.

JOHN J. DUFFY AND FREDERICK HOFFMAN, OF WATERFORD, NEW YORK.

TOOL FOR CUTTING VALVE STEMS.

Application filed November 22, 1927. Serial No. 235,068.

This invention relates to a cutting tool designed to cooperate with the valve stems of automobile tires to provide on such stems an accurate seat with which an appropriately formed cap may cooperate to completely seal the end of the stem against air leakage.

In valve stems for automobile tires as ordinarily constructed, there is provided an internal valve mechanism primarily designed to seat under the pressure from within the tube and to prevent leakage of the contained air. This valve mechanism, which is necessarily of an extremely delicate character, ordinarily ceases to properly function after continued use and that this disadvantage is recognized is clearly evident from the fact that such valve mechanism is designed for convenient removal from the valve stem in order to permit its replacement by a more perfect valve mechanism. The liability of leakage of such valve mechanism is so well understood and so prevalent that it forms a serious item in maintaining pneumatic tires properly inflated. The valve stems as constructed are provided with a separable cap designed to function to a greater or less degree to prevent air leakage in the event the valve mechanism proves defective. As a matter of fact, however, the valve stem caps are of little utility in this particular, being not only crudely formed but failing in any way to form an effective sealing juncture with the valve stem.

It is the object of the present invention to provide a tool which may be readily associated with the valve stem without the necessity of removing the tire from the wheel, and which, when so associated and operated, will form the usual cap-receiving shoulder on the valve stem into an accurately and perfectly formed metal seat, in order that a cap appropriately formed with a corresponding seat will, when properly seated upon the valve stem, provide a metal-to-metal seal through the cooperation of such seats which will effectively and positively prevent air leakage, notwithstanding a defective valve mechanism.

An essential feature of the present invention is the provision of a tool of this character of simple form and construction which may be readily associated with the valve stem, preferably by threading thereon to the appropriate position, and may be thereafter locked in such position with a portion of the tool rotatable and carrying a removable cutter to appropriately form the shoulder on the valve stem into the desired seat.

The invention is illustrated in the accompanying drawings, in which:

Figure 1 is a view in elevation showing the tool in position on a valve stem and the seat formed on the latter, as the result of tool operation.

Figure 2 is a similar view with the tool partly in section and the cutter removed.

Figure 3 is a plan showing the tool applied on the stem.

Figures 4 and 5 are perspective of cutters.

Figure 6 is a view in section, partly in elevation, showing the completed valve stem and the cap to be applied thereto.

The improved tool comprises a barrel 1 interiorly threaded for cooperation with the threaded portion 2 of the usual valve stem 3. The barrel 1 rotatably supports a cutter carrier 4 which is arranged concentric with the barrel and removably held against other than rotative movement with respect thereto through the medium of a flange 5 seating in a recess 6 in the lower face of the carrier and held against separation therefrom by a cap plate 7 secured to the carrier by set screws 8.

The carrier beyond the barrel is provided at an appropriate point with a threaded opening 9 to receive a set-screw 10, said set-screw being designed to engage a cutter 11, with the cooperation of an adjustable one through the slot 12 in the cutter. The cutter is formed with an appropriate cutting face 13 shaped to form the desired type of seat.

A lock nut 14 is arranged to cooperate with the threaded portion 2 of the valve stem in advance of the tool and serves to hold the tool, or more particularly the barrel 1 thereof, in a fixed position on the valve stem.

In applying the tool, the nut 14 is first applied to the valve stem and threaded downwardly thereon. The barrel with the carrier is then threaded onto the valve stem until the cutter 11 is at an appropriate position in alignment with the usual shoulder formed on the valve stem. To provide for advancing the tool onto or removing it from the stem, the barrel may, if desired, project beyond the cap 7 in the form of a nut or other non-circular outline, as indicated at 15.

After the tool has been moved to the proper position on the valve stem, the nut 14 is threaded upwardly into contact with the tool to prevent further movement of the latter longitudinally of the stem. The cutter 11 is then adjusted to cooperate with the shoulder of the valve stem, and the set-screw 10 tightened. The carrier 4 is then rotated, being preferably peripherally roughened to permit a better grip when operated by hand or by an appropriate operating tool engaged therewith. By rotation of the carrier and subsequent adjustments of the cutter 11, if necessary, the shoulder dividing the larger portion of the valve stem from the usual cap-receiving projections 16, is accurately formed into a perfect seat.

It is, of course, to be understood that the character of this seat may vary as such seat may be of the half round projecting type, indicated at 17 in Figures 1 and 2, or may be of the depressed half round type or other formation, such for example as would result from the use of the cutters illustrated in Figures 4 and 5.

A cap 18, which is somewhat similar to the ordinary type of cap employed with valve stems except that it is thicker in its lower portion and provided with a non-circular section 19 to permit the application of desired turning force, is formed at 20 with a seat accurately corresponding to the seat resulting from the use of the tool herein described. With the cap applied to the threaded projection 16 of the valve stem and with the desired force, the seats 20 and 17 will accurately cooperate, providing a metal-to-metal, non-leaking juncture between the valve stem and cap. Obviously, therefore, even in the event of a defective valve mechanism within the valve stem, leakage of air through and beyond the valve stem is impossible, and hence the serious disadvantages of air leakage incident to defective valve mechanisms is entirely avoided.

It is, of course, to be understood that the present cap and seat on the valve stem are not designed as a substitute for the usual valve mechanism. It is contemplated that the valve stems with the valve mechanism as at present in use are to be continued as a guard against air leakage, the improvement here described providing an additional measure which will effectively serve to prevent air leakage from the valve stem in the event the valve mechanism should fail for any reason.

An important and characteristic feature of the present invention is the fact that the tool as a whole is designed to cooperate with the valve stem without the necessity of removing the tire from the wheel; that is to say, an ordinary repairman, provided with the improved tool and with appropriate caps, may readily change the valve stems of the tires without the necessity of removing the tires or in any way changing or varying the arrangement in a simple, expeditious manner and without loss of time. By this operation on the respective valve stems, which it will be readily apparent is a matter of but a few moments, the driver of the vehicle may be insured against air leakage through the valve stem notwithstanding defective valve mechanism.

What we claim to be new is:

1. A tool for operating on valve stems, including a barrel threaded to cooperate with the threaded valve stem, a lock nut cooperating with the threaded valve stem below the barrel to hold the barrel against independent movement of the stem, a carrier mounted to rotate on the barrel, cooperating means on the barrel and carrier to secure the carrier against endwise movement relative to the barrel in either direction, and a cutter removably secured on the carrier and having a cutting face shaped to form a valve seat on the valve stem at a point above the barrel.

2. A tool for operating on valve stems, including a barrel interiorly threaded to cooperate with the threaded valve stem, a lock nut cooperating with the valve stem for locking the barrel against movement with respect to the stem, a carrier mounted for free rotation on and with respect to the barrel, a flange on the barrel seating in a recess in the carrier, a cap plate removably secured to the carrier and underlying the flange to thereby secure the carrier against endwise movement with respect to the barrel, and a cutter adjustably mounted on the carrier, said cutter having a cutting portion adapted to cooperate with the valve stem beyond the barrel to form a valve seat on said stem in the rotation of the carrier.

In testimony whereof we affix our signatures.

JOHN J. DUFFY. [L. S.]
FREDERICK HOFFMAN. [L. S.]